Sept. 3, 1968  W. M. HOLM  3,400,269
VARIABLE INTENSITY NEUTRON GENERATOR COMPRISING INTERMESHING
WEBS OF BERYLLIUM FOIL AND RADIUM IMPREGNATED GOLD FOIL
Filed March 17, 1965
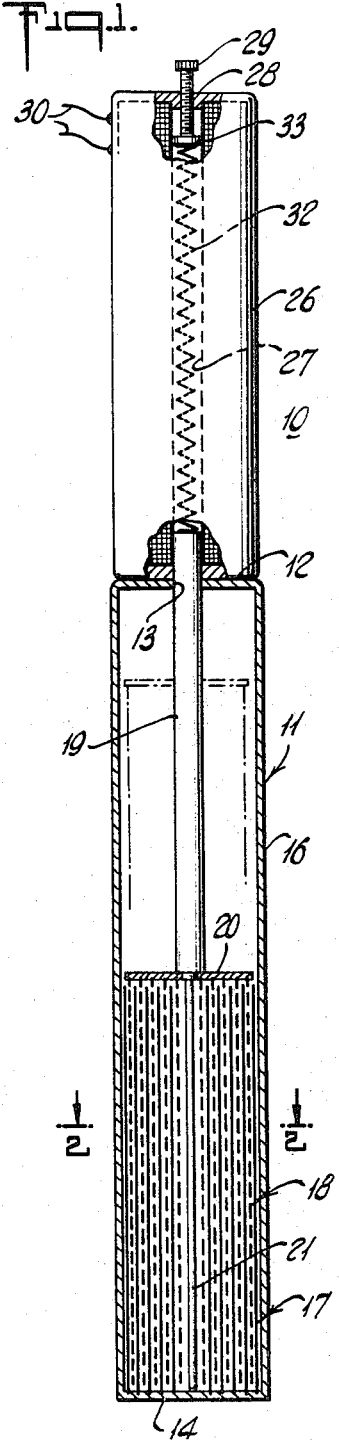
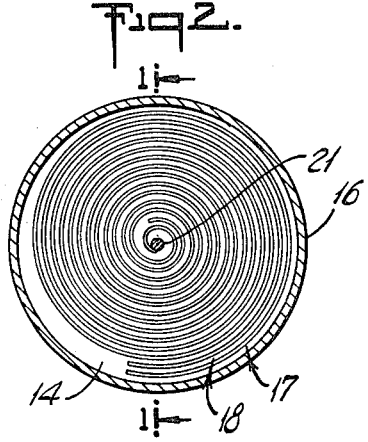
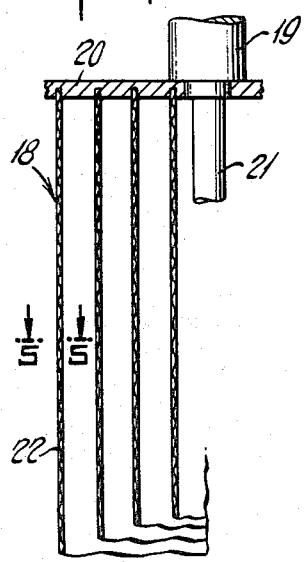
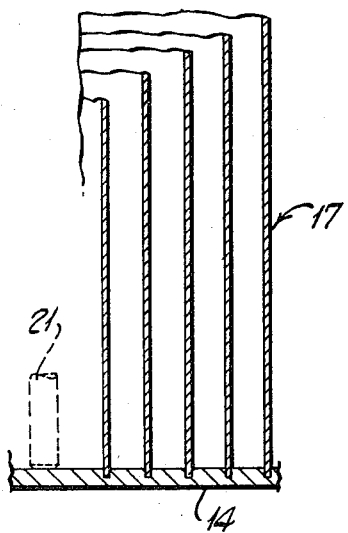
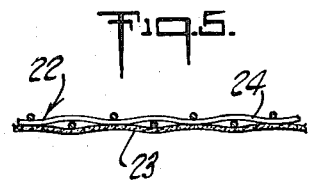
INVENTOR
WARREN M. HOLM
BY
William R. Liberman
ATTORNEY United States Patent Office 3,400,269
Patented Sept. 3, 1968

3,400,269
VARIABLE INTENSITY NEUTRON GENERATOR COMPRISING INTERMESHING WEBS OF BERYLLIUM FOIL AND RADIUM IMPREGNATED GOLD FOIL
Warren M. Holm, Baldwin, N.Y., assignor to Radium Chemical Company, Inc., New York, N.Y., a corporation of New York
Filed Mar. 17, 1965, Ser. No. 440,518
8 Claims. (Cl. 250—84.5)

ABSTRACT OF THE DISCLOSURE

A variable intensity neutron generator includes a pair of helically wound intermeshing webs of beryllium foil and gold foil having radium dispersed therein, housed in a casing, one of the helical webs being stationary and the other web being connected to an armature registering with the axial bore of a solenoid and spring urged outwardly to urge the helical webs into maximum registry. The neutron intensity may be adjusted by controlling the current to the solenoid and hence the degree of registry of the webs.

---

The present invention relates generally to improvements in the generation of nuclear particles and it relates in particular to an improved apparatus for the production of neutrons at an adjustable rate.

Many processes require for their practice a generator or source of neutrons at a relatively high rate and in a highly compact form. Typical of such processes are the neutron activation analyzing procedures and the various logging techniques employing these procedures. In many applications it is desirable to adjust the neutron flux or production rate of the generator, frequently from a point remote from the generator. However, the neutron generating devices heretofore available either did not permit any adjustment in the neutron production rate or were highly bulky and unwieldy mechanisms and otherwise left much to be desired. Another drawback of the conventional neutron generators resides in the high intensity neutron radiation which is usually continuously produced even when the generators are not in use. Since a high neutron flux represents a great personal hazard and since neutrons are highly pentrating it is necessary to shield the neutron generator when not in use or when within the proximity of personnel. Such shielding is of great weight and bulk and seriously impairs the portability of the neutron generator and its field usefulness.

It is, therefore, a principal object of the present invention to provide an improved apparatus for the production of nuclear particles.

Another object of the present invention is to provide an improved apparatus for the generation of neutrons.

Still another object of the present invention is to provide an improved neutron generator in which the rate of neutron production or neutron flux may easily be adjusted.

A further object of the present invention is to provide an improved high density neutron generator in which the neutron production rate may be remotely controlled.

Still a further object of the present invention is to provide an apparatus of the above nature characterized by its simplicity, compactness, ruggedness and reliability.

The above and other objects of the present invention will become apparent from a reading of the following description taken in conjunction with the accompanying drawing, wherein FIGURE 1 is a longitudinal vertical sectional view taken along line 1—1 of FIGURE 2 of a well logging neutron generator embodying the present invention;

FIGURE 2 is a section view taken along line 2—2 in FIGURE 1;

FIGURE 3 is an enlarged fragmentary sectional view of the movable element of the generator;

FIGURE 4 is an enlarged fragmentary sectional view of the stationary element of the generator; and FIGURE 5 is a sectional view taken along line 5—5 in FIGURE 4.

In a sense, the present invention contemplates the provision of a neutron generator comprising a plurality of intermeshing alternate layers of a beryllium-containing material and an alpha emitting material, and means for moving said alternate layers relative to each other substantially along the planes thereof whereby to vary the exposure of said beryllium to said alpha particles.

According to a preferred form of apparatus according to the present invention, the alternate layers of the neutron generator are defined by a pair of helically wound intermeshing first and second webs or sheets which are axially movable relative to each other. The first or outer sheet is formed of beryllium and the second or inner sheet is formed of a thinly rolled foil of radium impregnated gold which is reinforced and stiffened by a stiff fine large mesh screen. Means are provided for remotely axially adjusting the relative positions of the first and second helically wound sheets which means advantageously comprise an electric motor which may be a solenoid having an axially movable armature connected to one of said sheets to effect its axial movement relative to the other sheet, coupled to a remotely located control device. The axial adjustment may be continuous or in increments.

Referring now to the drawing which illustrates a preferred embodiment of the present invention, reference numeral 10 generally designates the improved variable flux neutron generator which is shaped and dimensioned to facilitate its use in well logging and similar techniques. The neutron generator 10 includes an elongated tubular cylindrical casing 11 formed of stainless steel or other suitable material and includes a top wall 12 provided with a central aperture 13, a bottom wall 14 and a cylindrical peripheral wall 16.

Bottom wall 14 is relatively heavy and has a helical groove formed in its inner face and extending from the center thereof. A target member 17, in the form of a helically wound sheet, is located in casing 11 and is coaxial therewith, the lower border of target 17 registering with and suitably anchored in the helical groove formed in wall 14. The inner end of target 17 is spaced outwardly from the axis of casing 11 and the outer end thereof extends substantially to the inner face of wall 16. The target sheet is formed of a material which emits neutrons when bombarded with alpha particles and is in a form which closely retains its helical shape. Beryllium foil or sheet is employed to great advantage as the target 17.

An axially movable alpha particle emitting member 18 includes an armature-defining rod 19 which is formed of a suitable magnetic material and is coaxial with casing 11 and slidably registers with aperture 13 in top wall 12. Secured to the bottom of rod 19 is a circular plate 20 of slightly less diameter than the inside face of the wall 16, and having a helical groove formed in its underface coaxial with helical target 17 and in vertical registry with the helical space delineated by successive convolutions of target sheet 17. Depending from and coaxial with the rod 19 is a rod 21 which is of slightly greater length than the height of target sheet 17.

A helically wound alpha particle emitting web or sheet 22 depends from the plate 20 and its upper border registers with and is suitably anchored in the helical groove formed in the underface of plate 20. The helical alpha partical emitting web 22 mates helical target sheet 17 and slidably registers with the space between the successive convolutions of target sheet 17, preferably being slightly spaced from the adjacent faces of sheet 17 to minimize abrasion attendant the adjustment of the generator. Any suitable means is provided for restricting any relative axial rotation between the target and emitter members 17 and 18.

The alpha emitting web 22 may be formed of any high alpha emitting material constructed to maintain its spiral shape. The alpha emitter is advantageously radium although such elements as actinium 227 or americium may be employed. Also, such other alpha particle emitting substances such as isotopes of curium, actinium, thorium or plutonium may be used. In the present embodiment, the alpha emitter sheet comprises a thin foil 23 of gold having radium dispersed therein, such material being available with activities up to about 500 microcuries per square inch. Foil 23 is reinforced by a thin, stiff, wide mesh grid or screen 24 to which the foil 23 suitably adheres. Grid 24 should be small in area so as to intercept and capture a minimum of alpha particles emitted by foil 23. Alpha particle emitter web 22 may be of other suitable construction; for example, foil 23 may be sandwiched between a pair of screens 24, or it may be formed of a stainless steel foil or other suitable core covered on opposite faces with the radium carrying gold foil, it being noted that in the latter case at least 50% of the emitted alpha particles are lost for the neutron production reaction.

Mounted atop casing 11 and coaxial therewith is an electrical solenoid 26 having an axial bore 27 formed therein with which the armature rod 19 slidably registers. The upper end of bore 27 is closed by a wall 28 having a tapped bore engaged by an adjustably axial thumb screw 29 provided at its inner end with an abutment plate 33. A helical compression spring 32 is entrapped between the upper face of the armature rod 19 and plate 33, normally to urge emitter member 18 to its lowermost position. It should be noted that the bottom of rod 21, when emitted member 18 is in its depressed position, engages wall 14 to locate plate 20 above the upper edge of target sheet 17 and the lower edges of emitter web 22 above wall 14.

Solenoid 26 may be selectively energized or deenergized by connecting it by way of a pair of leads 30 and a suitable switching means to a source of current. When solenoid 26 is deenergized, armature 19 is released and urged downwardly by compression spring 32 to depress fully the alpha emitting member into full engagement with target member 17 thereby to expose the latter to a maximum alpha radiation with the production of a maximum neutron flux. Upon the energization of solenoid 26 the emitter member is raised to reduce the alpha radiation of target member 17 and hence the resulting neutron flux. The relationship between the maximum and minimum neutron flux produced by generator 10 substantially corresponds to the ratio of the areas of target sheet 17 directly confronting the alpha emitting web when emitter member 18 is in its depressed and raised positions respectively. This ratio may be varied by varying the axial stroke of the emitter member 18 which may be effected to some extent by adjusting thumb screw 29. The minimum neutron flux may be substantially zero by effecting the substantially complete withdrawal of the alpha emitter member 18 from any registry with the target member 17 thereby permitting the handling of the neutron generator without the need for any shielding.

While there has been described and illustrated a preferred embodiment of the present invention, it is apparent that numerous alterations, omissions and additions may be made without departing from the spirit thereof. For example, while the alpha particle emitting member 18 is illustrated as being the movable member it may be the stationary member and the target member 17 may be the movable member. Further, solenoid 26, which effects a single increment adjustment of the neutron generator, may be replaced by a repeater motor which may effect a continuous adjustment of the neutron flux, the motor affecting the adjustment of the portion of the emitter member 18 in any suitable manner.

What is claimed is:

1. A neutron generator comprising a plurality of transversely spaced first layers of a beryllium-containing material and a plurality of transversely spaced second layers of an alpha-emitting material in alternate interleaved relationship with said first layers and longitudinally movable relative thereto, and means for moving said alternate layers relative to each other substantially along the plane thereof whereby to vary the exposure of said beryllium to said alpha particles.

2. A neutron generator comprising helically wound substantially superimposed webs of a beryllium-containing material and of an alpha-emitting material and means for moving said helically wound webs relative to each other whereby to vary the exposure of said beryllium to said alpha particles.

3. A neutron generator comprising a plurality of transversely spaced first layers of a beryllium-containing material and a plurality of transversely spaced second layers of an alpha-emitting material in alternate interleaved relationship with said first layers and longitudinally movable relative thereto, and remotely controlled means for moving said alternate layers relative to each other substantially along the plane thereof whereby to vary the exposure of said beryllium to said alpha particles.

4. A neutron generator comprising a plurality of transversely spaced first layers of a beryllium-containing material and a plurality of transversely spaced second layers in alternate interleaving relationship with said first layers and longitudinally movable relative thereto and of a material containing an alpha-emitting element selected from the class consisting of radium, actinium 227 and americium and means for moving said alternate layers relative to each other substantially along the planes thereof whereby to vary the exposure of said beryllium to said alpha particles.

5. A neutron generator comprising a plurality of transversely spaced first layers of a beryllium-containing foil, and a plurality of transversely spaced second layers in alternate interleaving relationship with said first layers and longitudinally movable relative thereto and formed of gold foil having an alpha emitting material dispersed therein, and means for moving said alternate layers relative to each other substantially along the planes thereof whereby to vary the exposure of said beryllium to said alpha particles.

6. A neutron generator comprising a pair of helically wound intermeshing webs of beryllium foil and gold foil having radium dispersed therein and means for axially adjusting said helically wound webs relative to each other whereby to vary the exposure of said beryllium to the alpha particles from said radium.

7. The generator of claim 6 including a grid adherent to and reinforcing said gold foil.

8. The generator of claim 6 wherein said adjusting means includes a solenoid joined to one of said webs and a relatively movable armature activated by said solenoid and joined to the other of said webs.

References Cited

UNITED STATES PATENTS

| 2,275,748 | 3/1942 | Fearon | 250—84.5 X |
| 2,303,688 | 12/1942 | Fearon | 250—83.6 |
| 3,070,697 | 12/1962 | Meunch | 250—84.5 X |

ARCHIE R. BORCHELT, *Primary Examiner.*